United States Patent [19]

Massey

[11] Patent Number: 4,626,018

[45] Date of Patent: Dec. 2, 1986

[54] VEHICLE SEAT SUSPENSION APPARATUS

[76] Inventor: Ross Massey, 216 Harding Pl., Nashville, Tenn. 37205

[21] Appl. No.: 609,899

[22] Filed: May 14, 1984

[51] Int. Cl.⁴ .............................................. B60N 1/02
[52] U.S. Cl. ................................ 296/65 R; 296/65 A; 248/602; 248/631; 297/345
[58] Field of Search ..................... 296/63, 65 R, 65 A; 248/580, 581, 602, 631; 267/131; 297/345, DIG.3

[56] References Cited

U.S. PATENT DOCUMENTS

| 1,355,225 | 10/1920 | Gynn | 248/602 |
| 1,979,892 | 11/1934 | Loeffler | 248/581 |
| 3,558,094 | 1/1971 | Radke et al. | 248/631 |
| 3,845,982 | 11/1974 | Pickles | 296/65 A |
| 3,999,733 | 12/1976 | Harder, Jr. et al. | 297/345 |
| 3,999,800 | 12/1976 | Penzotti | 297/345 |
| 4,198,092 | 4/1980 | Federspiel | 296/65 R |
| 4,222,555 | 9/1980 | Eimen | 267/131 |
| 4,477,062 | 10/1984 | Smeltzer et al. | 267/64.28 |

FOREIGN PATENT DOCUMENTS

| 2715547 | 10/1978 | Fed. Rep. of Germany | 248/580 |
| 1454017 | 8/1966 | France | 297/345 |
| 2424146 | 12/1979 | France | 296/63 |

Primary Examiner—Robert B. Reeves
Assistant Examiner—Dennis H. Pedder
Attorney, Agent, or Firm—Rodgers & Rodgers

[57] ABSTRACT

Vehicle seat suspension apparatus comprising a forwardly and rearwardly adjustable vehicle seat being interconnected to the floor of the vehicle by first and second bracket means, the first and second bracket means being interconnected by means of a spring and a shock absorber assembly, a slot formed in one of the brackets, and a portion of the other bracket being disposed in the slot to prevent lateral movement of the seat.

7 Claims, 3 Drawing Figures

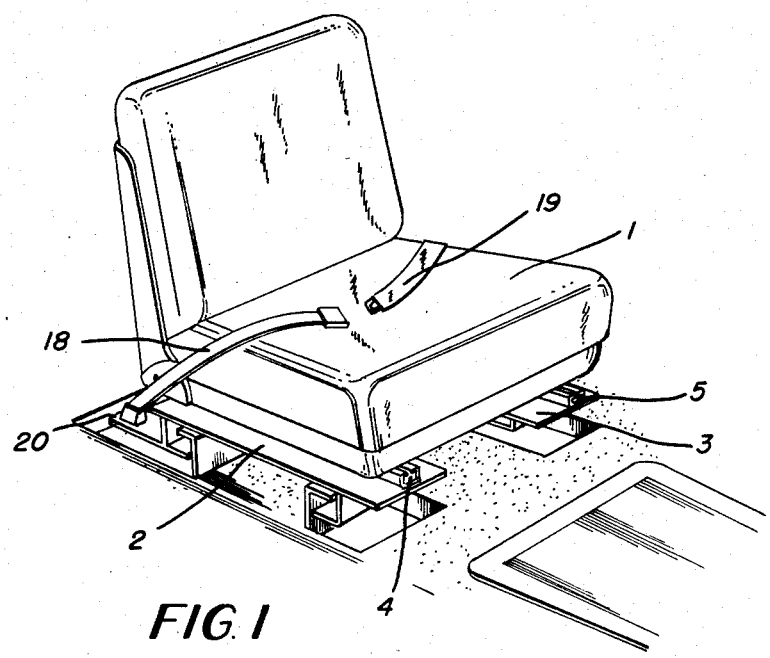
FIG. 1
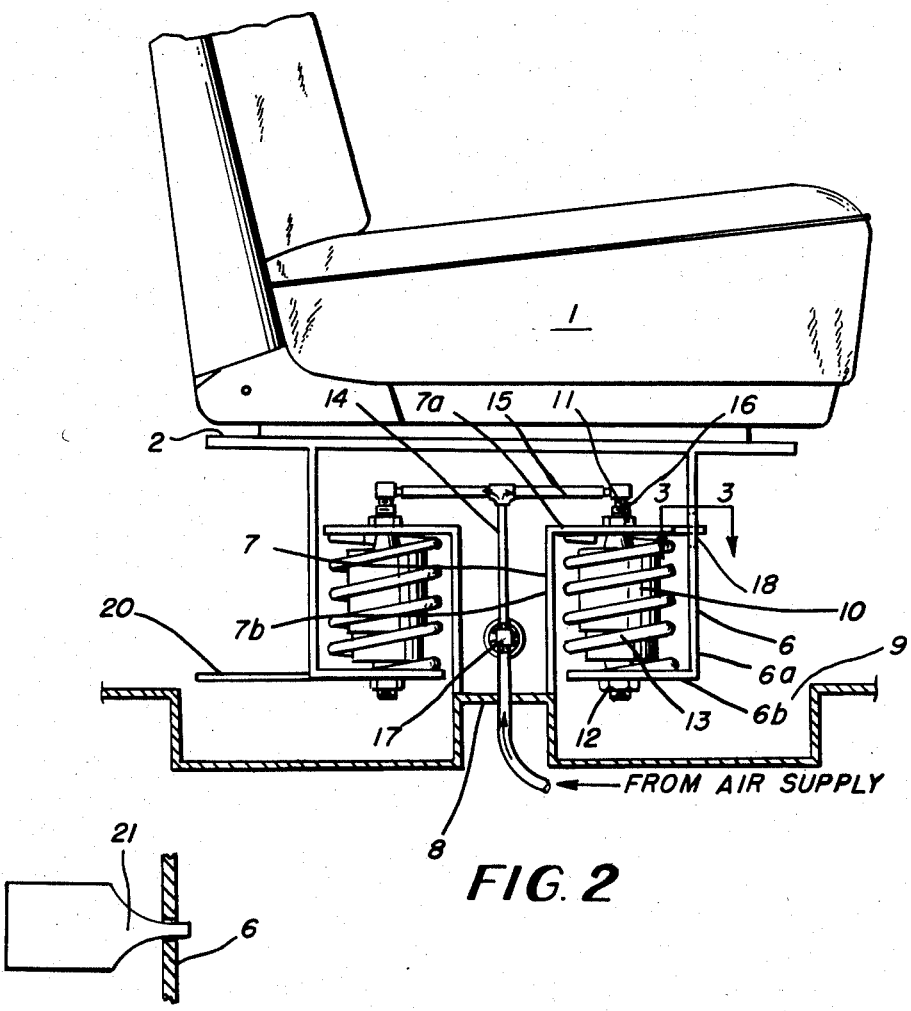
FIG. 2
FIG. 3

VEHICLE SEAT SUSPENSION APPARATUS

TECHNICAL FIELD

This invention relates to means for suspending a seat from a vehicle floor so as to provide a comfortable ride for the occupant of the seat by eliminating the undesirable effects of vibrations caused by irregularities in the road surface.

BACKGROUND ART

Various suspension systems are known such as those disclosed in U.S. Pat. Nos. 4,401,290; 4,351,556; 2,597,800; 2,368,727; 2,140,423 and 1,711,085. In general the prior art systems do not provide effective isolation especially of vertical vibrations due to roadway bumps, holes and the like.

DISCLOSURE OF THE INVENTION

Vehicle seat suspension apparatus is provided and comprises a vehicle seat, the vehicle seat being joined to a first bracket means, a second bracket means being joined to the vehicle, and the first and second bracket means being interconnected and vertically movable independently of each other.

BRIEF DESCRIPTION OF THE DRAWINGS

In the drawing,

FIG. 1 is a perspective view of the vehicle seat suspension apparatus constructed according to this invention;

FIG. 2 is a side elevational view taken from the left side of FIG. 1; and

FIG. 3 is an enlarged sectional view taken along the line 3—3 in FIG. 2.

BEST MODE FOR CARRYING OUT THE INVENTION

In the drawing, the numeral 1 designates the vehicle seat which is slidably mounted respectively on horizontal plates 2 and 3 by means of track assemblies 4 and 5. Of course the seat can be moved forward and backward as desired by the vehicle occupant as is well known.

According to this invention, seat suspension apparatus is provided in the form of four assemblies for each vehicle seat. Since each assembly is essentially identical, only one will be discussed in detail.

As best shown in FIG. 2, first bracket means 6 is joined to horizontal plate 2 by means such as welding or the like. More specifically first bracket means 6 comprises vertical element 6a extending downwardly from horizontal plate 2 and horizontal element 6b joined to the lower end of vertical element 6a and extending at a right angle therefrom. In similar fashion, second bracket means 7 is provided and comprises horizontal element 7a and vertical element 7b. Vertical element 7b, as shown in FIG. 2, is joined to vehicle floor 8 by welding or the like and extends upwardly therefrom with horizontal element 7a being joined to the upper end thereof and extending at a right angle therefrom. In addition, formed in floor 8 is recess 9.

First bracket means 6 and second bracket means 7 are interconnected by means of shock absorber 10 which is suitably connected to horizontal element 7a by means of nut and bolt assembly 11 and to horizontal element 6b by means of nut and bolt assembly 12. Also surrounding shock absorber 10 is spring 13 which is joined to the lower surface of horizontal element 7a by suitable means such as welding and is further joined to the upper surface of horizontal element 6b in similar fashion. In addition to acting as the interconnection between first bracket means 6 and second bracket means 7, shock absorber 10 and spring 13 function as load bearing means for vehicle seat 1.

Shock absorber 10 is pneumatically actuated and controlled by means of the flow of air through conduits 14, 15 and 16 as is well known. In addition hand operated valve 17 is provided in order to manually control the supply of air to shock absorber 10. Of course the air could be supplied by a pump driven by the vehicle engine or could be supplied from an outside source such as a service station and simply stored in the vehicle. Although shown as being pneumatically actuated, shock absorber 10 could also function by hydraulic means.

In order to provide means for attachment of seat belt elements 18 and 19 to the vehicle, seat belt extension 20 is provided in connection with the rearward two suspension assemblies. In effect seat belt extension 20 is joined to the particular suspension assembly at the junction of vertical and horizontal elements 6a and 6b and extends rearwardly therefrom and is disposed in the same plane as horizontal element 6b. Also the danger of passenger entanglement with the seat belt is reduced since the belt is not attached to the vehicle floor.

In order to limit lateral movement of seat 1, an aperture is provided in vertical element 6a of each of the front suspension assemblies in the form of slot 18. As best shown in FIG. 3, horizontal element 7a of each front assembly is tapered on its free end at 21 and is disposed in slot 18. By this means, lateral swinging movement of seat 1 is eliminated. Although the width of slot 18 is essentially equal to the width of end 21, an amount of vertical play of end 21 is necessary in slot 18 since the seat and associated suspension apparatus vibrate in a vertical direction during operation of the vehicle.

Therefore it can be seen that as a passenger vehicle travels over rough or irregular roadways, bracket means 6 and 7 move independently of each other in the vertical direction which allows shock absorber 10 and spring 13 to compress and, in effect, cushion and isolate seat 1 from roadway vibration. Also it can be seen that in situations where the roadway is especially rough and wherein the distance between plate 2 and conduit 15 is sufficiently great that downward movement of the first bracket means 6 will simply cause it to enter recess 9 and not come in contact with floor 8.

INDUSTRAIL APPLICABILITY

By this invention, vehicle seat suspension apparatus is provided which effectively eliminates road vibration and allows the seat occupant to ride in comfort.

I claim:

1. Vehicle seat suspension apparatus comprising a vehicle seat, said vehicle seat being joined to a first bracket means, a second bracket means being joined to said vehicle, said first bracket means being vertically movable relative to said second bracket means, said first bracket means comprising a first vertical element extending downwardly from said vehicle seat and a first horizontal element joined to said first vertical element remote from said seat, said second bracket means comprising a second vertical element extending upwardly from the connection with said vehicle and a second horizontal element joined to said second vertical element remote from said connection, said second horizontal element being disposed intermediate said seat and said first horizontal element, said first and second horizontal elements being spatially separated and bearing upon each other by an intervening load bearing means, a slot formed in said first vertical element, and a portion of said second horizontal element remote from said second vertical element being disposed in said slot to limit lateral swaying of said seat.

2. Apparatus according to claim 1 wherein said first horizontal element and said second horizontal element are interconnected by means of a spring.

3. Apparatus according to claim 1 wherein said first and second bracket means are interconnected by means of a shock absorber.

4. Apparatus according to claim 3 wherein said shock absorber is disposed inside a spring.

5. Apparatus according to claim 1 wherein said first bracket means first comprises a seat belt extension joined thereto and disposed in general alignment with said horizontal element of said first bracket means.

6. Apparatus according to claim 1 wherein a recess is formed in said vehicle so as to receive said first bracket means during downward movement thereof.

7. Apparatus according to claim 3 wherein said shock absorber is pneumatically operable.

* * * * *